United States Patent
Pauporte et al.

(10) Patent No.: US 6,175,910 B1
(45) Date of Patent: Jan. 16, 2001

(54) SPECULATIVE INSTRUCTIONS EXECTION IN VLIW PROCESSORS

(75) Inventors: Andre Pauporte, LaColle/Loup; Francois Jacob, Vence, both of (FR)

(73) Assignee: International Business Machines Corportion, Armonk, NY (US)

( * ) Notice: Under 35 U.S.C. 154(b), the term of this patent shall be extended for 0 days.

(21) Appl. No.: 09/098,297

(22) Filed: Jun. 16, 1998

(30) Foreign Application Priority Data

Dec. 19, 1997 (EP) .................................................. 97480092

(51) Int. Cl.⁷ ....................................................... G06F 15/00
(52) U.S. Cl. ................................................................ 712/217
(58) Field of Search ............................... 712/24, 23, 239, 712/240, 217

(56) References Cited

U.S. PATENT DOCUMENTS

| | | | |
|---|---|---|---|
| 4,574,349 | * | 3/1986 | Rechtschaffen ....................... 711/154 |
| 4,992,938 | * | 2/1991 | Cocke et al. .......................... 712/217 |
| 5,613,132 | * | 3/1997 | Clift et al. ............................ 712/217 |
| 5,613,151 | * | 3/1997 | Dockser ................................ 711/202 |
| 5,644,746 | * | 7/1997 | Holt et al. ............................ 712/217 |
| 5,809,276 | * | 9/1998 | Deosaran et al. ..................... 712/217 |
| 5,974,524 | * | 10/1999 | Cheong et al. ......................... 712/23 |
| 5,996,068 | * | 11/1999 | Dwyer, III et al. ................... 712/228 |

* cited by examiner

Primary Examiner—Larry D. Donaghue
(74) Attorney, Agent, or Firm—Scully, Scott, Murphy & Presser; Marian Underweiser, Esq.

(57) ABSTRACT

The object of the present invention is to improve the execution of instructions using speculative operations in Superscalar or Very Long Instruction Word (VLIW) processors having multiple Arithmetic Logic Units (ALUs). More particularly, the invention relates to a system and method for using standard registers as shadow registers. The addresses of all standard registers are translated using a Relocation Table (RT) array. The addresses of registers used as shadow registers are translated another time using a Speculative Registers Table (SRT) array. At branch completion time, for the speculative operations that have previously been executed and correctly predicted, the Relocation Table (RT) is updated with the Speculative Registers Table (SRT) content. For the speculative operations that have previously been executed and incorrectly predicted, the Relocation Table (RT) remains unchanged. The present invention performs the same function as processors using state of the art hardware shadow registers while using a limited number of read/write ports standard register array.

9 Claims, 8 Drawing Sheets

FORMAT OF INSTRUCTION

SPECULATIVE REGISTER TABLE

|  | (811) INITIAL REGISTER | (812) SPECULATIVE REGISTER | (813) F/NF | (814) Y/N |
|---|---|---|---|---|
| ADDRESS 1 | 76 | 37 | NF | Y |
| 2 |  |  | F |  |

SPECULATIVE INSTRUCTIONS EXECTION IN VLIW PROCESSORS

TECHNICAL FIELD

The present invention generally relates to a microprocessor architecture for optimizing execution of instructions using speculative operations in Very Long Instruction Word (VLIW) processors having multiple Arithmetic Logic Units (ALUs) and more particularly to a system and method for using standard registers as shadow registers.

BACKGROUND ART

DEFINITIONS

The following definitions will be helpful to the reader for understanding the description:

ALU:
An ALU (Arithmetic and Logic Unit) is a logic mechanism capable of computing arithmetic (addition, subtraction, etc . . . ) and logic operations (and, or, etc . . . ).

Operation:
An operation is the tiniest executable command a processor is capable of handling. (example: ALU operation, Memory operation, etc . . . ).

Instruction:
An instruction is the content of one word of the Instruction Store. It may be composed of one or multiple operations. For example a VLIW (Very Long Instruction Word) instruction specifies more than one concurrent operations.

ALU Operation:
An ALU operation is an operation involving an Arithmetic and Logic Unit. ALU operations are arithmetic (addition, subtraction, . . . ) or logic (and, or, . . . ) operations.

IO Operation:
An IO (input/Output) operation is an operation capable of accessing an external device using read and write operations (example: load IO, store IO, etc . . . )

Memory Operation:
A memory operation is an operation capable of accessing an external memory using read and write operations (example: load local memory, store local memory, etc . . . )

Branch:
An instruction may point to the next instruction address (for example 103 to 104), or to any other instruction address (for. example 103 to 221). The fact of going to an instruction address different from the next one is called a branch.

Basic Block:
A basic block is a set of instructions placed between two consecutive branch operations.

Branch Operation:
A branch operation is an operation capable or routing the program to a new address distinct from the next address (present address plus one).

Multiport Array:
A multiport array is a set of registers where multiple registers can be written or read at the same time.

Ports:
Each set of wires necessary to perform a read or write operation is called a port. For example, a multiport array can have two write ports, and four read ports. Two distinct data in two distinct addresses can be written and four distinct data from four distinct addresses can be read at the same time.

Processor Cycle:
A processor is composed of a set of logic elements, all timed (allowed to change value) at discrete instants. These instants are periodical, and the period is called processor cycle.

Source Registers:
The input data of an instruction are in registers called source registers.

Target Register:
The result of an instruction is assigned to a register called target register.

Shadow register:
As it is not known whether speculative operations must take place or not, results of these operations are assigned to registers different from target registers. These registers are called shadow registers.

SUPERSCALAR PROCESSORS

Most up to date processors belong to the category of superscalar RISC/CISC, (Reduced Instruction Set Computer/Complex Instruction Set Computer) processors. These processors comprise multiple internal processing units with a hardware mechanism for dispatching multiple instructions to said multiple processing units, each instruction comprising a single operation. The dispatching mechanism allows the execution of multiple instructions in a single processor cycle using a queue of instructions, with a mechanism capable of searching within the queue the instructions capable of being executed at the same time while they are originally in a given sequence.

VLIW PROCESSORS

Very Long Instruction Word (VLIW) processors constitute another category of processors where each instruction allows the execution of multiple operations, each operation corresponding to an internal processing unit. VLIW processors are simpler than superscalar processors in that the feeding of the multiple executions units is already done at the instruction level.

The basic principles of VLIW processors are described in a publication entitled "Super Scalar Microprocessor Design" from Mike Johnson (Prentice Hall Series in Innovative Technology 1991 p.25). In VLIW processors, a single instruction specifies more than one concurrent operation. In comparison to scalar processors, because a single VLIW instruction can specify multiple operations (in lieu of multiple scalar instructions), VLIW processors are capable of reducing the number of instructions for a program. However, in order for the VLIW processor to sustain an average number of cycles per instruction comparable to the rate of a scalar processor, the operations specified by a VLIW instruction must be independent from one another. Otherwise, the VLIW instruction is similar to a sequential, multiple operation CISC (Complex Instruction Set Computer) instruction, and the number of cycles per instruction goes up accordingly. As the name implies, the instruction of a VLIW processor is normally quite large, taking many bits to encode multiple operations. VLIW processors rely on software to pack the collection of operations representing a program into instructions. To accomplish this, software uses a technique called compaction. The more densely the operations can be compacted (that is, the fewer the number of instructions used for a given set of operations), the better is the performance, and the better is the encoding efficiency. During compaction, null operation fields are used for instruction that cannot be used. In essence, compaction serves as a limited form of out of order issue, because operations can be placed into instructions in many different orders. To compact instructions, software must be able to detect independent operations, and this can restrict the processor architecture, the application, or both.

SIMULTANEOUS EXECUTION OF INSTRUCTIONS

In the search for high performance, both superscalar and VLIW processors try lo split the code in "basic blocks". These basic blocks are sets of instructions placed between two consecutive branch operations and which present no data dependency, or resources conflict. These basic blocks allow simultaneous execution of all instructions within the block, and can be packed in a smaller number of VLIW instructions. Present examples of code running in real time VLIW processors show that the size of basic blocks may be small. This leads to unused operations within the instructions used to perform the basic blocks. However, these empty operations may be filled with operations coming from other basic blocks.

SPECULATIVE INSTRUCTIONS

In an ever going search for performance, it has been made possible to use the empty fields left in VLIW instructions for performing operations belonging to other basic blocks. These operations displaced from one block to another, and executed while not knowing whether they should be performed are called speculative operations. FIG. 1 describes an instruction in a VLIW processor capable of performing simultaneously three operations:

1. an ALU operation (115), with data in source registers R1 (102) and R2 (103), result written into target register R2, with a speculative flag S (111), and an identification of the source of the instruction B (112) ("Y" (YES) or "N" (NO) side of the next branch).
2. an ALU or memory operation (116), with data in source registers R3 (107) arid R4 (108), result written in target register R4, with a speculative operation flag S (113), and an identification of the source of the instruction B (114) ("Y" (YES) or "N" (NO) side of the next branch).
3. a branch operation (100).

The instruction described in FIG. 1 comprises the following fields:

A: an ALU operation field (101);
R1,R2,R3,R4: register fields (102,103,107,108);
S: speculative operation flags (111 and 113);
   S=1 speculative operation
   S=0 non speculative (normal) operation
When a scheduler moves an instruction up through the branch the S field is set (S=1). An instruction that is not moved from its original basic block has a S field set to zero (S=0).
B: branch side identifiers (branch side taken) (112 and 114);
   B=0 speculative operation originating from the "N" side of next branch
   B=1 speculative operation originating from the "Y" side of next branch
BRANCH: a branch operation field (100);
ALU/Mem: an ALU or memory operation field (106).

Fields (111) and (112) refer to speculative execution of ALU code (101), and fields (113) and (114) refer to speculative execution of ALU/Mem code (106).

Additional fields S (111, 113) and B (112, 114)) indicate whether the operation is speculative or not and if the operation is speculative, from which side of the next branch the operation comes from.

FIG. 2 shows a portion of code with seven instructions, including two instructions including no operation fields (instructions 201 and 202), an instruction comprising a branch operation (203c) and two basic blocks at each side of the branch, both containing two instructions.

Instruction (201) comprises:
1. an ALU field (201a) used by a "sub" operation (subtraction): the result of the subtraction of the content of registers R1 and R2 is written in register R2 (R1-R2=>R2).
2. an ALU/Mem field (201b) unused (nop).
3. a branch field (201c) unused (nop).

Instruction (202) comprises:
1. an ALU field (202a) unused (nop).
2. an ALU/Mem field (202b) unused (nop).
3. a branch field (202c) unused (nop).

This instruction is empty because the branch field (203c) in instruction (203) is conditional and uses flags set by operation (201a) in instruction (201). Due to the pipeline structure of the processor, these flags are usable only two instructions after being set. Thus, instruction (202) is left empty.

Instruction (203) comprises:
1. an ALU field (203a) used by a "dec" operation (decrementation): the content of register R7 is decremented by one and the result is written in register R7 (R7-1=>R7).
2. an ALU field (203b) used by a "dec" operation (decrementation R2-1=>R2).
3. a branch field (203c) to chose one or the other side of branch (203c) (204 if test is positive—"Y" side—or 206 if test is negative—"N" side).

Instruction (204) comprises:
1. an ALU field (204a) used by a "add" operation (addition): the content of register R2 is added to the content of register R1 and the result is written in register R1 (R2+R1=>R1).
2. an ALU/Mem field (204b) used by a "LL" (load local memory) operation ((R4)=>R5).
   A load local memory operation is an operation capable of loading a register at a given address with the content of a local memory.
3. a branch field (204c) unused (nop).

Instruction (205) comprises:
1. an ALU field (205a) used by a "sub" operation (subtraction R6-R3=>R6).
2. an ALU/Mem field (205b) unused (nop).
3. a branch field (205c) unused (nop).

Instruction (206) comprises:
1. an ALU field (206a) used by an "add" operation (addition R1+R2=>R1).
2. an Alu/Mem field (206b) used by a "stio" operation (Store I/O R3=>(R0)).
   A Store IO operation is intended to store in an external device the content of a processor register.
3. a branch field (204c) unused (nop).

Instruction (207) comprises:
1. an ALU field (207a) used by an "inc" operation (incrementation): the content of register R9 is incremented by one and the result is written in register R9 (R9+1=>R9).
2. an ALU/Mem field (207b) unused (nop).
3. a branch field (207c) unused (nop).

FIG. 3 shows the moves that are performed by the compaction process for executing the different operations. The operations which are moved from a basic block to a previous one become speculative operations.

the incrementation (207a) (R9+1=>R9) in instruction (207) is moved to (301b) to be executed in instruction (301).

the subtraction (205*a*) (R6−R3=>R6) is moved to (302*a*) to be executed in instruction (302).

the load local memory operation (204*b*) is moved to (302*b*) to be executed in instruction (302).

Indicators (311*b*), (312*a*), (312*b*) are added in the instructions for indicating that these operations are speculative (S), and for determining from which side of the branch ("Y" or "N") they come. Instructions (305) and (307) are now empty, and thus the number of instructions is reduced from seven to five. This is a gain of 20% on both sides of the branch.

COMPENSATION MECHANISM

An efficient parallel execution of instructions must spread across branch boundaries. However, software scheduling across branches causes some difficulties. The most important problem is caused by speculative instructions that are executed when they should not be executed, because a branch outcome is different than the outcome predicted by software.

Software Compensation

The instruction format described in FIG. 1 supports software code motion through branches. The S field allows a software scheduler to increase performance by scheduling speculative instructions across branches, without the expense of out of order issue. The compensation for an incorrectly executed speculative instruction is performed merely by inserting a compensation instruction to the alternate path. For more simplicity, the scheduler can move an instruction only from a basic block to the preceding one.

Hardware Compensation

The S field allows the hardware to identify speculative instructions and to cancel the effects of an incorrect execution without the need for compensation code. If the S field is set (S=1), the hardware places the result value of the instruction into a shadow register array and marks the corresponding entry as active. As described in FIG. 9, each entry in the shadow register array corresponds to an entry in the standard register array. After the result is written into the shadow register array, subsequent instructions can refer to this value; these instructions would have followed the speculative instruction in the original code, and their results also are written into the shadow register array. In general, an instruction can refer to the values either in the standard register array or the shadow register array, but the hardware controls which register array (standard or shadow register array) receives the result values. When a decoded instruction has a zero S field, its result value goes directly to the standard register array. The shadow register array holds instruction results until the results can be correctly placed into the standard register array. Each time that a branch has the outcome predicted by software, the hardware transfers each active entry of the shadow register array into the corresponding entry in the standard register array. All writes occur in a single cycle. Each time that the branch instruction does not have the outcome predicted by software, the the hardware discards all entries in the shadow register array.

According to prior art, the solution for transferring the speculative operation results from the shadow register array into the standard register array is to use a multiport array, one port per shadow register. A multiport array allows to copy the contents of shadow registers into processor registers without affecting the processor access to said registers. However, this solution costs a lot in terms of register size because adding ports increases the size of the register array. Furthermore, microelectronic technology does not support a very high number of ports per register, thus limiting the number of shadow registers. The problem is even higher in processors using a large number of standard registers such as 256 registers of 32 bits, which is a common value in VLIW. As a coarse estimation, the size of a multiport depends directly on the number of ports, and thus adding two write ports (for two additional shadow registers) to, for example, an existing 2 write ports register array would multiply by two the size of the multiport register array. Another limitation is that enlarging these arrays slows down the access time to the registers, thus slowing down the whole processor.

SUMMARY OF THE INVENTION

The object of the present invention is to use standard registers as shadow registers. The addresses of all standard registers are translated using a Relocation Table (RT) array. The addresses of registers used as shadow registers are translated another time using a Speculative Registers Table (SRT) array. At branch completion time, for the speculative operations that have previously been executed and correctly predicted, the Relocation Table (RT) is updated with the Speculative Registers Table (SRT) content. For the speculative operations that have previously been executed and incorrectly predicted, the Relocation Table (RT) remains unchanged.

DESCRIPTION OF THE PREFERRED EMBODIMENT

The present invention provides means for implementing a speculative operation execution on processors (VLIW processors or others) using standard registers as shadow registers. Standard registers are relocated before access, and a Speculative Registers Table (SRT) provides means for using a register as an ordinary register or as a shadow register. In the following examples, all tables sizes are given for a processor with a standard register array of 256 registers—the register array being accessed using 2 write ports/4 read ports—and 2 shadow registers.

DESCRIPTION OF THE TABLES

Relocation Table (RT)

Figure 6:
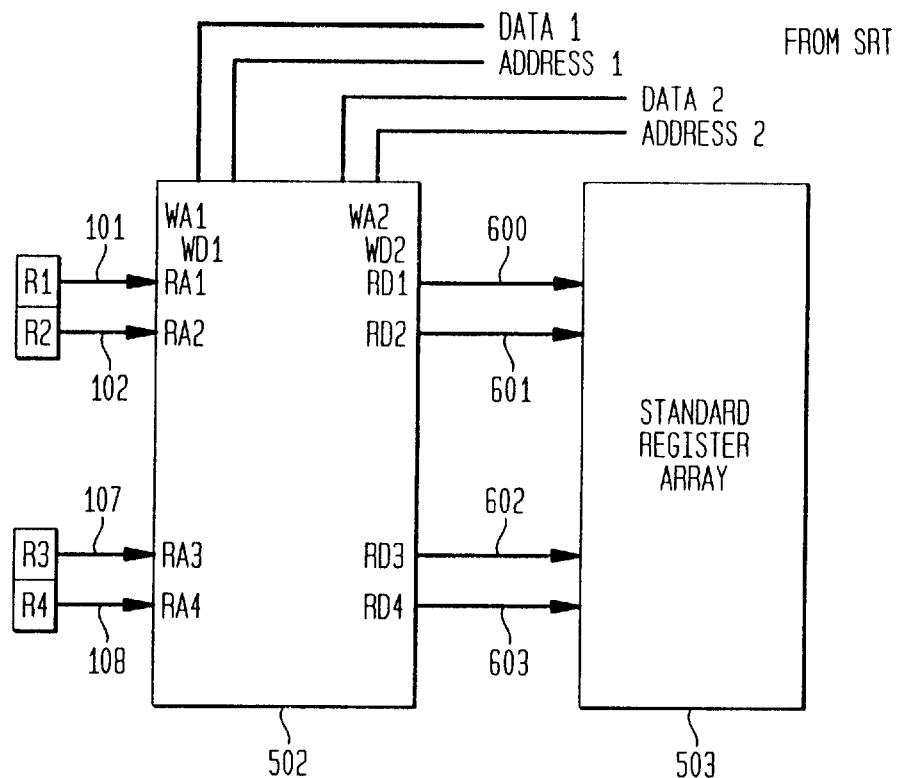
FIG. 6 describes the Relocation Table with the standard register array according to the present invention.

The Relocation Table (RT) is used for all (speculative and non speculative) instructions and affects all register addresses. The Relocation Table (RT) has as many entries as standard registers. The table translates dynamically a registrar address to another address. As shown in FIG. 6, this table is a 4 read ports/2 write ports multiport array of 256 words 8 bits wide (words of 8 bits are required for accessing the 256 standard registers). FIG. 6 describes the Relocation Table in connection with the standard register array.

The Relocation Table (RT) comprises:

4 read register addresses for addressing the translated addresses of the standard registers:
RA1: R1 register address (102)
RA2: R2 register address (103)
RA3: R3 register address (107)
RA4: R4 register address (108)

4 read register data for accessing the translated addresses of the standard registers:
RD1: read data 1 (600)
RD2: read data 2 (601)
RD3: read data 3 (602)
RD4: read data 4 (603)

2 write ports for updating the Relocation Table (RT) with the content of the Speculative Register Table (SRT):
WA1: write address 1 update RT with register add given by (811)
WD1: write data 1 update RT with register data given by (812)
WA2: write address 2 update RT with register add given by (815)
WD2: write data 2 update RT with register data given by (816)

Figure 7:
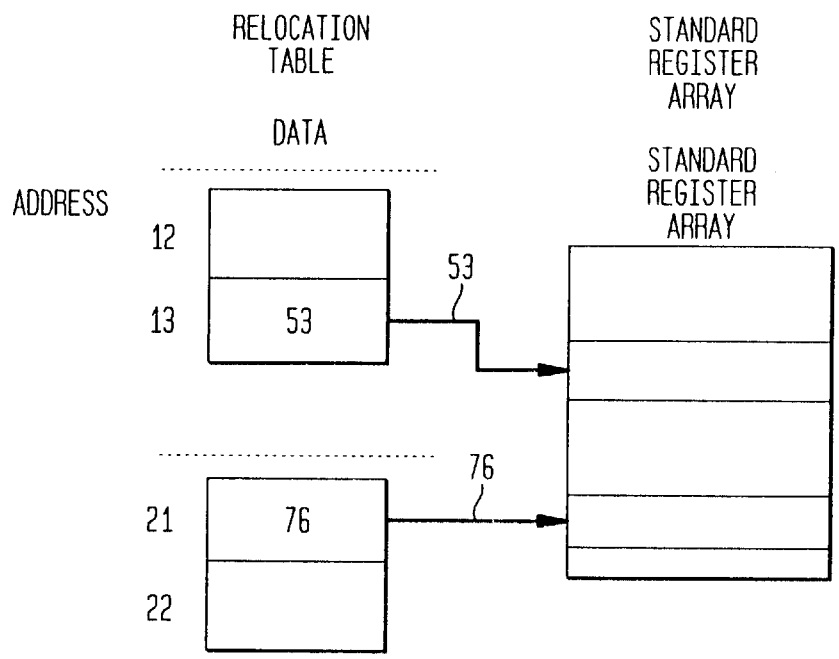
FIG. 7 describes the initial state of the Relocation Table according to the present invention.

The Relocation Table is initialized at power on with data values equal to address values (0 in location 0, and so forth up to 255). The Relocation Table is updated each time a speculative instruction is predicted correctly. For example, as shown in FIG. 7, at each register corresponds an address in the Relocation Table. The address of registers R13 and R21 is respectively equal to 13 and 21. The address of registers R13 and R21 translated by the Relocation Table is respectively equal lo 53 and 76 in the standard register array.

If the operation is not speculative, a "add" operation (addition) add R13,R21,R21 effectively reads registers at addresses (53) and (76) and writes the result in register at address (76).

If the operation is speculative, the address of the target register is translated one more time by means of the Speculative Register Table (SRT) described hereunder.

Speculative Register Table (SRT)

Figures 8, 9:
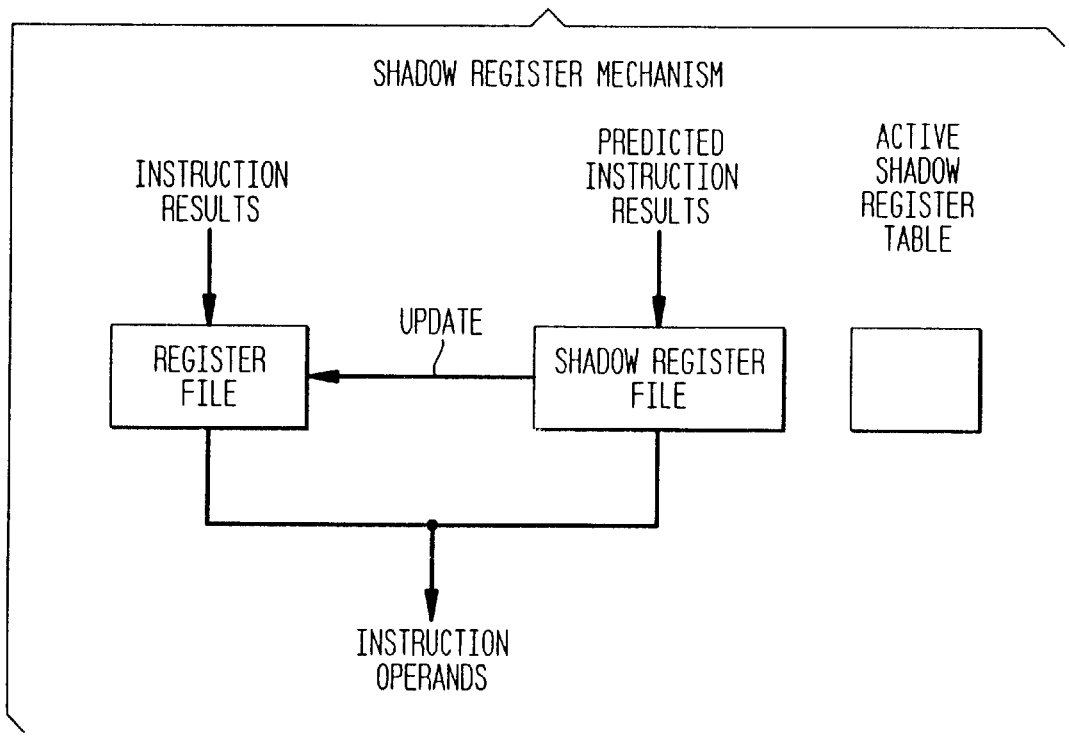
FIG. 8 describes the Speculative Register Table according to the present invention.
FIG. 9 shows the shadow register mechanism according to prior art.

The Speculative Register Table is used for speculative instructions only and affects only registers used as speculative registers. The table has as many entries as speculative registers (the number of speculative registers is determined by the processor architecture). As shown in FIG. 8, in case of execution of a speculative operation, the Speculative Registers Table translates dynamically the address of the target register. In a preferred embodiment, the SRT is a 18 bits×2 words table with 2 read/write ports. The Speculative Registers Table (SRT) comprises for each entry (each speculative register):

an initial original target register address (811);
a speculative register address (812);
a free/not free "F/NF" flag indicating if the entry is currently used "F" or not "NF" (813);
a branch identifier (side "Y" (YES) or "N" (NO)) indicating, if the entry is used, from which side of the branch the operation comes (814).

FIG. 8 shows an example where register address (76) is translated to register address (37), for a speculative operation coming from the "Y" side of the next branch operation.

EXECUTION OF THE INSTRUCTIONS

Normal Instruction

Figure 1:
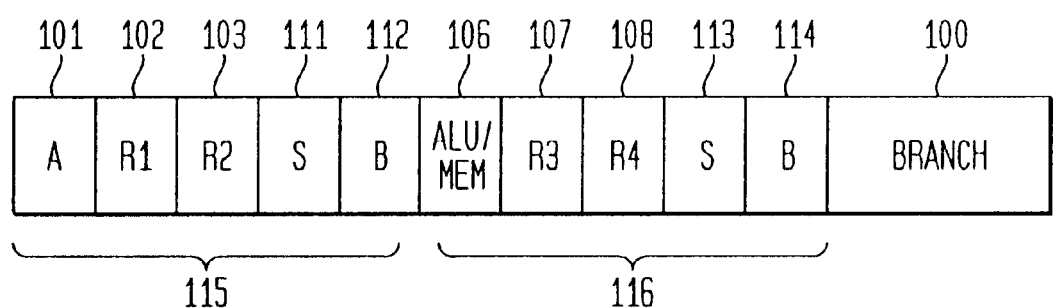
FIG. 1 shows an instruction for a VLIW processor according to the present invention.
Figure 2:
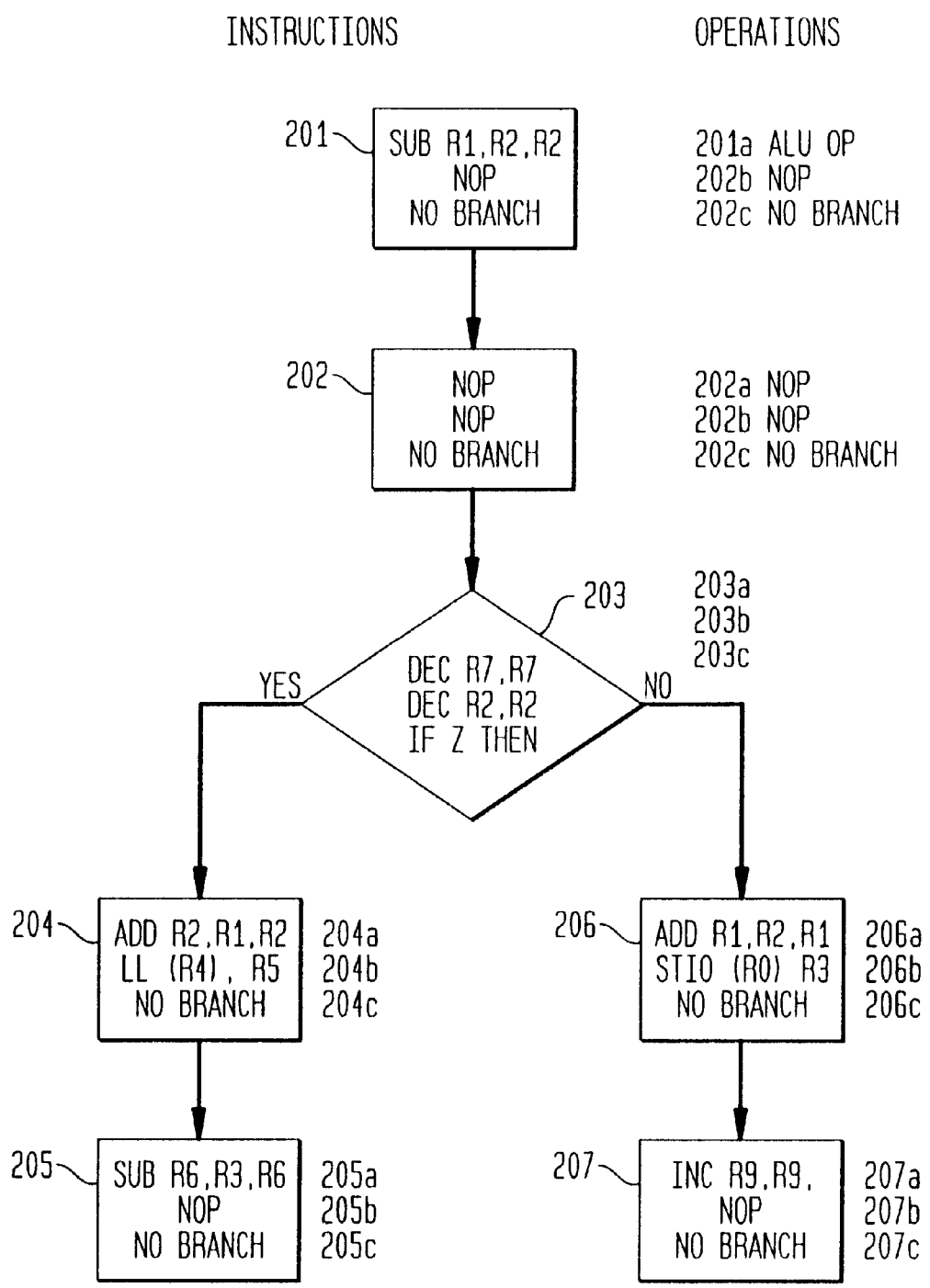
FIG. 2 shows a portion of code with a branch and instructions containing empty operation fields.
Figure 3:
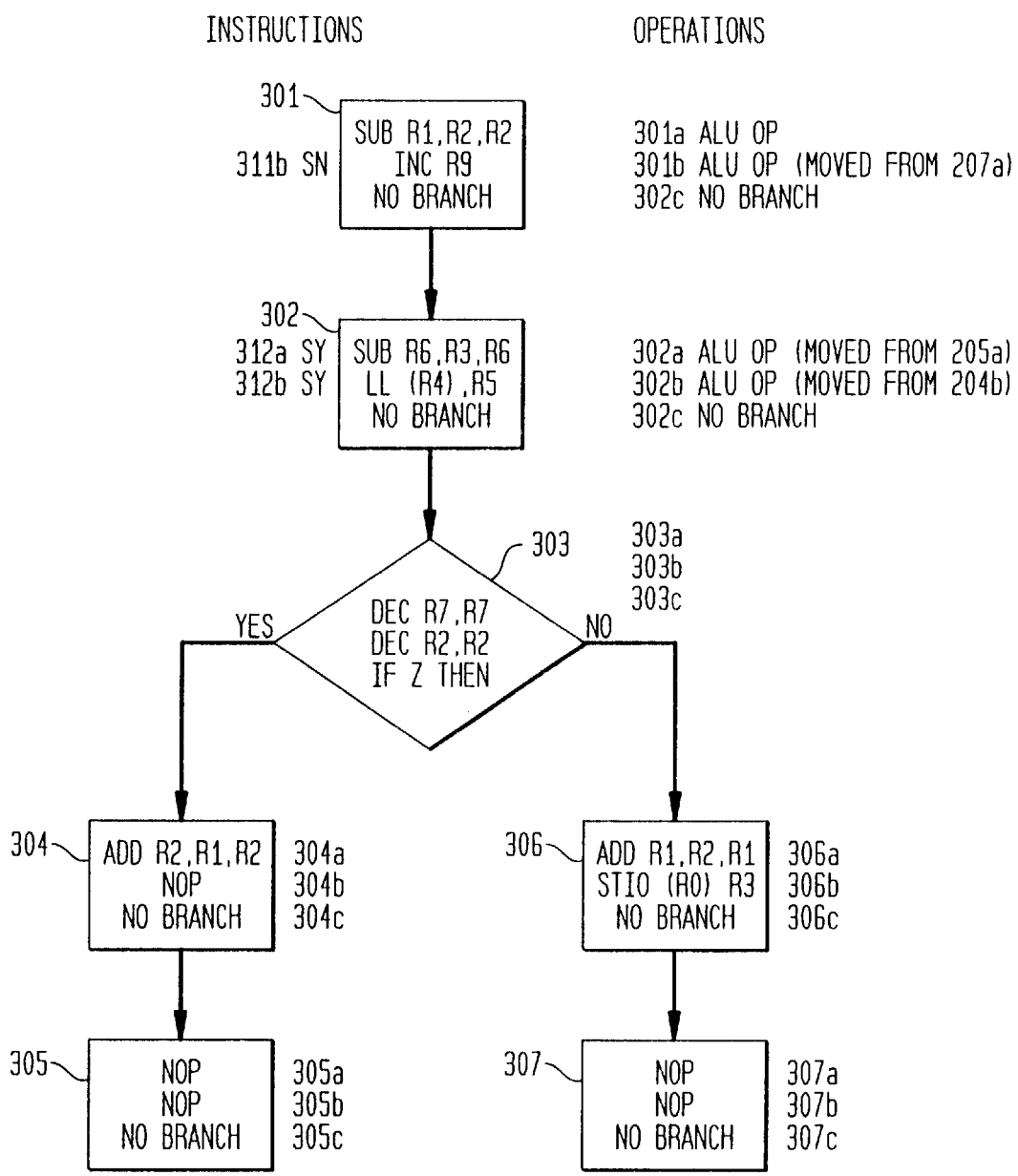
FIG. 3 shows the code of FIG. 2 after compaction.
Figure 4:
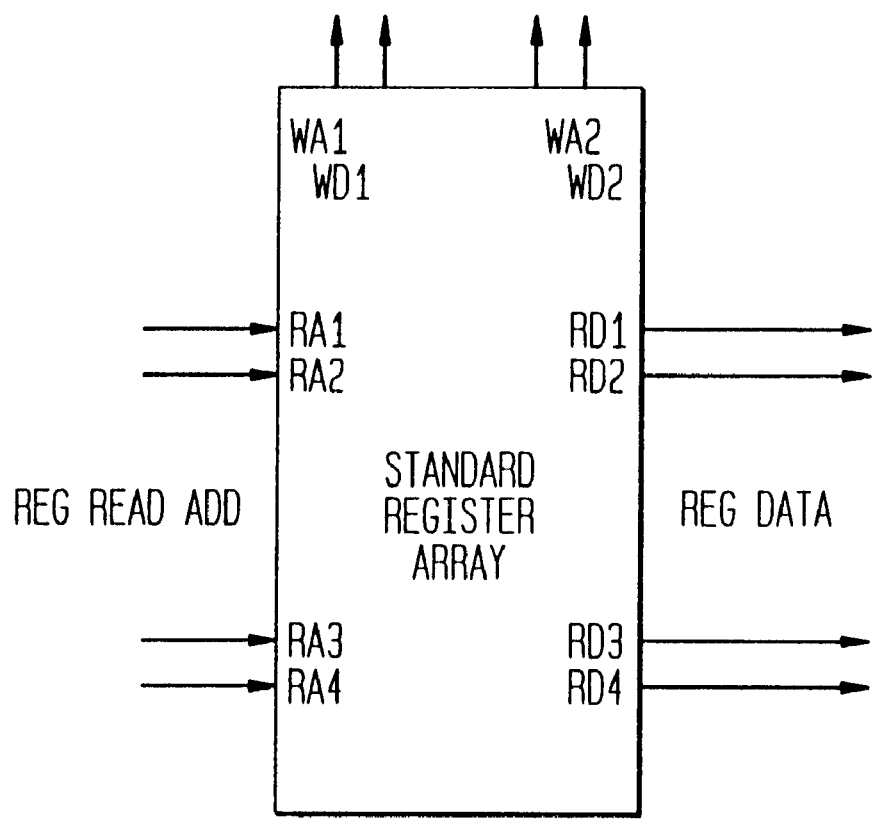
FIG. 4 shows a multiport register array according to prior art.
Figure 5:
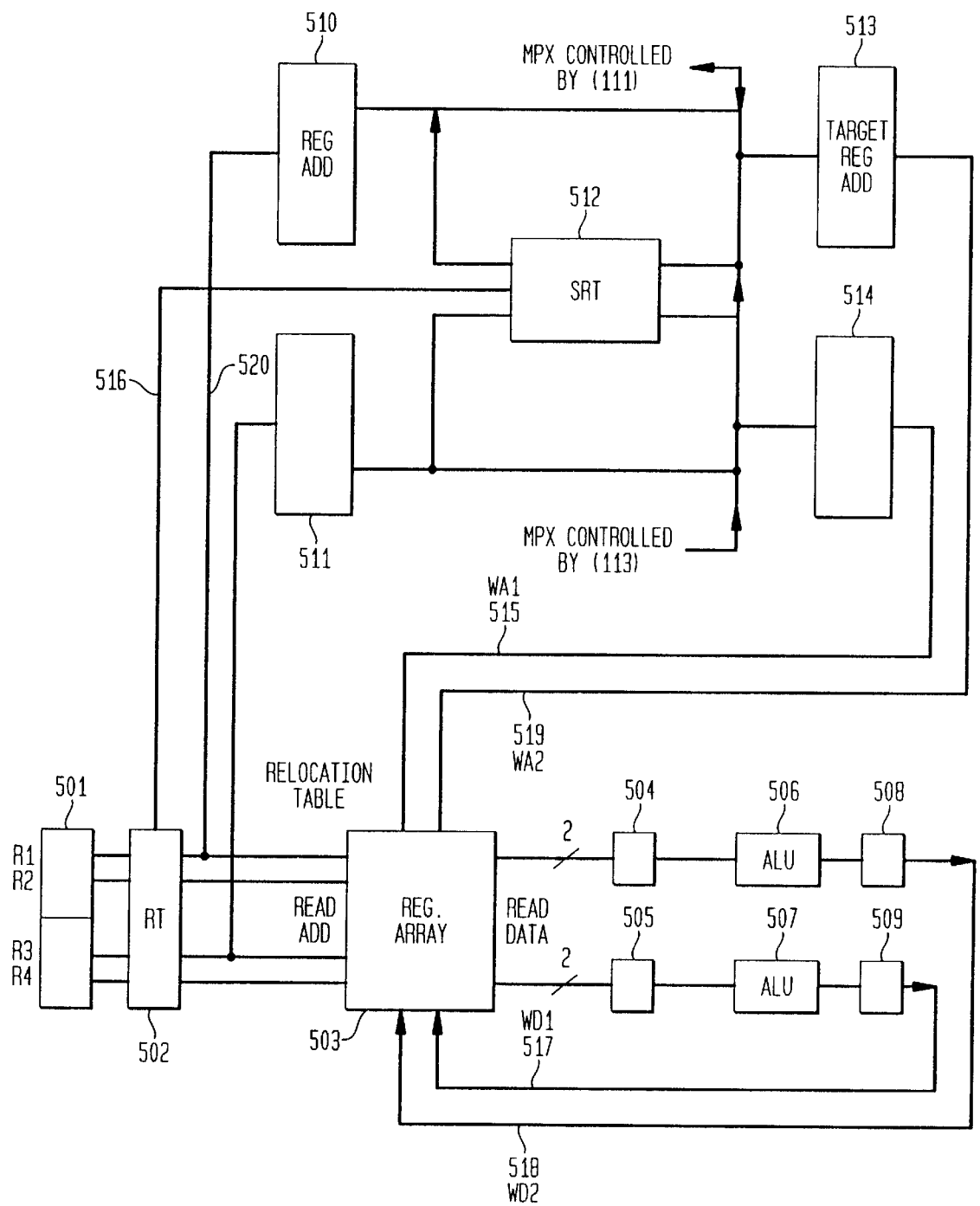
FIG. 5 shows an overview of the register data flow according to the present invention.
Figure 10:
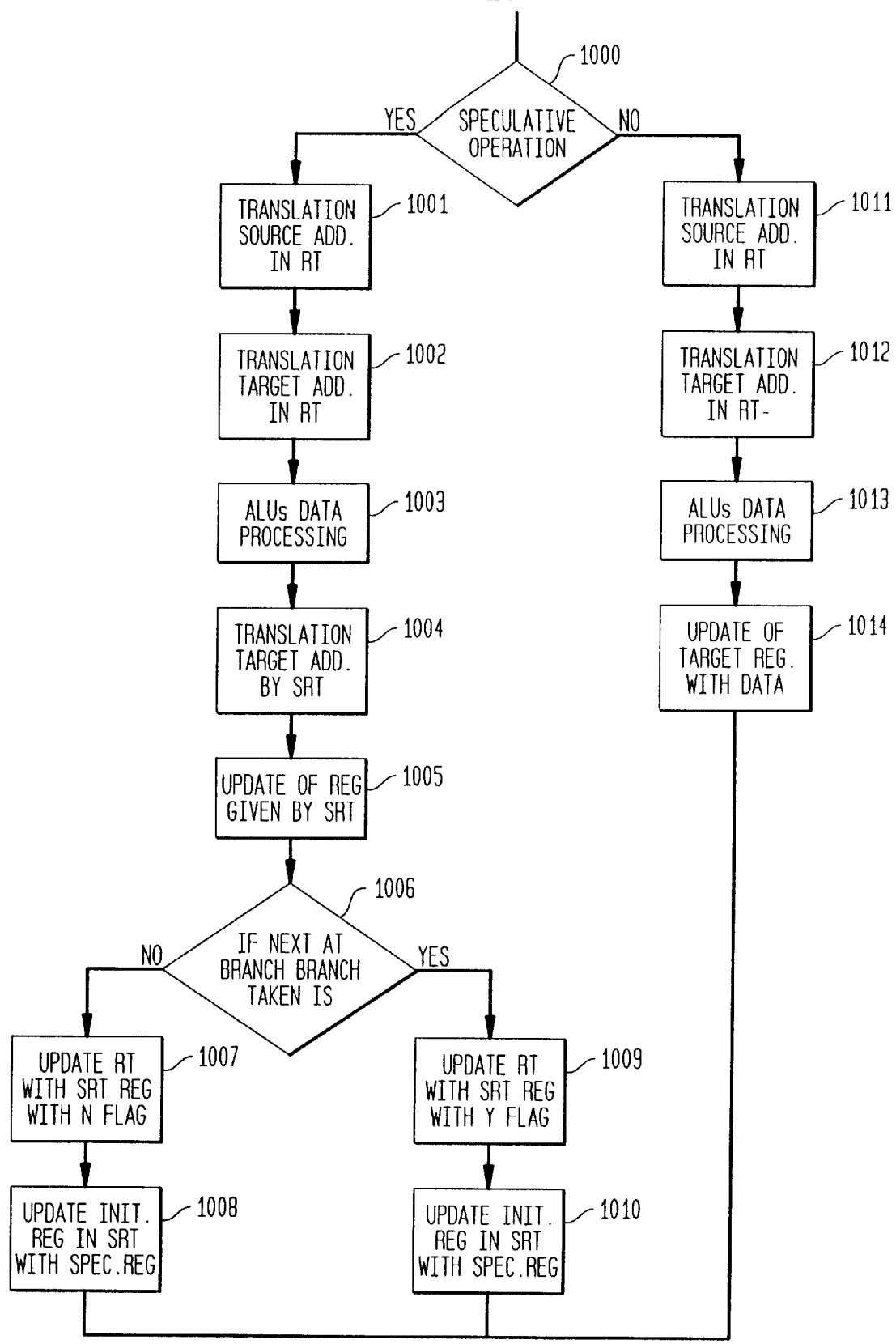
FIG. 10 is a flow chart of the mechanism according to the present invention.

A normal instruction is an instruction with no speculative operation. The instruction type (speculative or not) is indicated in fields S (111 and 113)(step 1000). As shown in FIG. 10, in a normal instruction:

(1011, 1012) Addresses of registers R1, R2, R3 and R4 indicated in fields (102),(103),(107) and (108) are translated using the Relocation Table (RT) (502). The translated addresses are used to access the standard register array identified as (503) in FIG. 5. The data read in standard registers are written in input buffers (504) and (505).

(1013) The input buffers hold the data while the ALUs process said data. At next clock cycle, the results of the ALUs (506) and (507) are stored in output buffers (508) and (509).

(1014) At next clock cycle, data is stored in the target register in the standard register array (503) using path (517, 518). The addresses of the target registers are given by the Relocation Table (RT) using path (515, 519) and are not affected by the Speculative Register Table (SRT). The process for determining the target registers addresses is under the control of multiplexers which are driven by the speculative operation flags S (111 and 113) within the instruction.

Speculative Instruction.

A speculative instruction is identified by means of the speculative operation flags S (111 and 113) (step 1000). As shown in FIG. 10, in a speculative instruction:

(1001, 1002) As for normal instructions, the addresses of registers R1, R2, R3 and R4 indicated in fields (102), (103),(107), and (108) are translated using the Relocation Table (RT) (502). The translated addresses are used to access the standard register array identified as (503). The data read are writen in input buffers (504) and (505).

(1003) The input buffers hold the data while the ALUs process said data. At next clock cycle, the results of ALUs (506) and (507) are stored in output buffers (508) and (509).

(1004) The target registers addresses are translated using the Speculative Registers Table (SRT) (512). The process for determining the target registers addresses is under the control of multiplexers which are driven by the speculative operation flags S (111 and 113) within the instruction.

The registers pointed by the target address registers (513) and (514) are updated with the content of data output buffers (508) and (509).

For example, the addition add R13,R21,R21 entails the reading of standard registers at addresses (53) and (76) as shown in FIG. 7. The write result is relocated in the standard register at address (37) (if the Speculative Registers Table (SRT) is initialized as shown in FIG. 8). FIG. 8 also shows the use of the free/not free flag "F/NF" (813) indicating that the first entry of the Speculative Registers Table (SRT) is used, and the B (814) identifier indicating the origin side of the branch. The Speculative Registers Table (SRT) described in FIG. 8 contains two entries which means that up to 2 shadow registers (and thus 2 speculative operations) are possible within the same basic block.

On completion of the next branch:

If the speculative operation has been correctly predicted, all shadow registers containing results of executions originating from the branch taken write their speculative register address from the Speculative Register Table (SRT) (512) to the Relocation Table (RT) (502) using path (516). At the same time, the initial address (811) in the SRT is set as a speculative address register (812), and the free/not free flag "F/NF" (813) is set as "free".

If the speculative operation has not been correctly predicted, the RT is not updated and the flag "F/NF" (813) is set as "free".

ADVANTAGES

Solutions used in prior art multiply by 1.5 the size of the standard register array, by adding 2 write ports to an existing 4 read/write ports. The present invention allows to perform the same function while using a small 2 read/write port Relocation Table (RT), a 2 entries Speculative Register Table (SRT), and a normal register array.

What is claimed is:

1. A method for improving execution of instructions with speculative operations in superscalar or very long instruction word processors, said method using one or more of a plurality of standard registers in a standard register array as shadow registers, one shadow register per speculative operation, said method comprising:
   a) translating addresses of said plurality of standard registers using a first table;
   b) translating addresses of said one or more of said plurality of standard registers used as shadow registers using a second table; and
   c) updating addresses of one or more of said plurality of translated standard registers in the first table with addresses of one or more of said plurality of standard registers used as shadow registers in the second table at execution of a branch operation.

2. The method according to claim 1, wherein said first table comprises for each standard register of said plurality of standard registers an entry which includes a standard register address and a translated register address for dynamically translating the standard register address to the translated register address.

3. The method according to claim 2, wherein for each speculative operation said second table comprises an entry having:
   a target register address corresponding to a translated register address of a standard register in the first table;
   a speculative register address for identifying a standard register used as a shadow register; and
   a branch side identifier indicating a side of a branch operation to which the speculative operation belongs.

4. The method according to claim 3, further comprising the step of:
   determining, at execution of the branch operation, whether the speculative operations are correctly predicted by comparing an actual branch side resulting from the branch operation with the branch side identifier of each said entry of the second table.

5. The method according claim 4, wherein the step of updating addresses of one or more of said plurality of translated standard registers comprises:
   updating, at execution of a branch operation, the addresses of one or more of said plurality of translated standard registers of the first table with the speculative register address of each entry of the second table corresponding to a correctly predicted speculative operation.

6. The method according claim 5, comprising the further step of:
   remaining unchanged, at execution of a branch operation, the addresses of one or more of said plurality of translated standard registers of the first table for each entry of the second table corresponding to an incorrectly predicted speculative operation.

7. A system for improving execution of instructions with speculative operations in superscalar or very long instruction word processors, said method using one or more of a plurality of standard registers in a standard register array as shadow registers, one shadow register per speculative operation, said system comprising:
   a) a first table for translating addresses of said plurality of standard registers;
   b) a second table for translating addresses of said one or more of said plurality of standard registers used as shadow registers; and
   c) a means for updating addresses of one or more of said plurality of translated standard registers with addresses of one or more of said plurality of standard registers used as shadow registers at execution of a branch operation.

8. The method according to claim 1, wherein the first table comprises four read ports for addressing and accessing addresses of the plurality of standard registers in the standard register array.

9. The method according to claim 1, wherein the first table comprises two write ports for updating addresses of the one or more of said plurality of translated standard registers in the first table with addresses of one or more of said plurality of standard registers used as shadow registers in the second table.

* * * * *